May 31, 1949.    J. H. BOOTH    2,471,672
JOINT ASSEMBLY
Filed Oct. 22, 1945
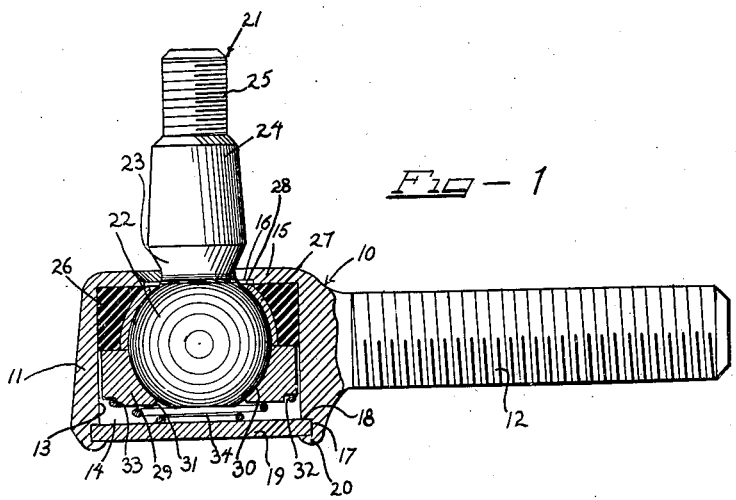
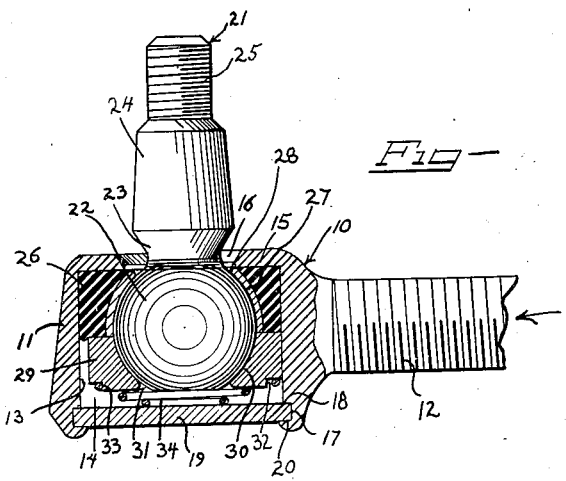
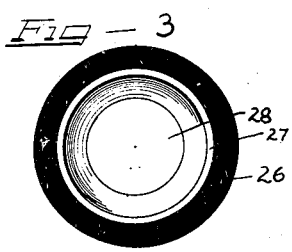
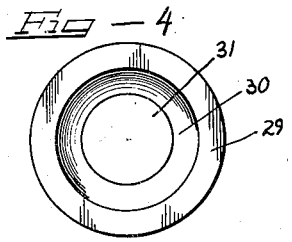
Inventor
James H. Booth Patented May 31, 1949

2,471,672

UNITED STATES PATENT OFFICE 2,471,672

JOINT ASSEMBLY

James H. Booth, Detroit, Mich., assignor to Thompson Products, Inc., Cleveland, Ohio, a corporation of Ohio Application October 22, 1945, Serial No. 623,739

7 Claims. (Cl. 287—85)

This invention relates to joint assemblies having parts in bearing engagement arranged to accommodate a limited amount of movement between the parts without shifting the bearing relationship of the parts.

Specifically the invention deals with ball and socket joints having opposed bearing rings in the socket thereof with one ring being loosely disposed in the socket and the other ring including resilient deformable material arranged to deform upon endwise movement of the socket until the first mentioned ring engages the socket.

The invention will hereinafter be specifically described as embodied in a ball and socket tie rod joint, but it should be understood, of course, that the principles of this invention are applicable to joints in general and the invention is not limited to the specifically described embodiment.

According to this invention a tie rod socket or end receives the ball end of a stud. A first bearing ring composed of rubber or other deformable resilient material is lined with a metal or plastic fragmental spherical shaped bearing cup surrounding the ball end of the stud in bearing engagement. The rubber ring is seated in the socket with a slight press fit, so that it will always be in engagement with the socket wall. A second bearing ring composed of plastic material or non-ferrous metal with anti-squeak properties surrounds the portion of the ball end of the stud extending from the rubber ring. This second ring has a fragmental spherical recess therein cooperating with the cup in the first ring to form a full ball seat for the ball end of the stud. However, the second ring has an outer diameter smaller than the inside diameter of the socket so that this ring is loosely fitted in the socket. A spring acts on the second ring to urge it toward the first ring and thereby take up wear developed on the bearing surfaces, to maintain full bearing engagement between the stud, the cup of the rubber ring, and the recess of the second ring. Upon end-wise loading of the socket the rubber will initially be deformed to permit end movement of the socket until the second ring engages the socket wall, whereupon the two bearings provided by the two rings will take the full bearing load and transfer it from the socket to the stud. Conversely, endwise movement of the stud will likewise initially deform the rubber ring and then carry the second ring into engagement with the socket whereupon the full load will be transferred from the stud to the socket. This arrangement permits an initial shifting between the socket and stud without tilting the parts and thereby effecting a shifting of the bearing surfaces. This permits maintenance of predetermined angular relationship between the parts even when the members to which these parts are connected are somewhat misaligned. In addition, shock loads on the parts are absorbed by deformation of the rubber before the loads are transferred from one part to another. At the same time "mushy" conditions are avoided, such as occur in rubber bushed joints, because rigid bearing surfaces are maintained in engagement and will transfer loads without yielding after a predetermined amount of deformation of the rubber. Thus, while the rubber is initially deformed to accommodate initial shifting of the parts, the amount of this deformation is limited by engagement of the other ring with the socket.

It is, then, an object of this invention to provide a joint assembly permitting a limited amount of shifting movements between the parts without changing the angular relationship of the parts or causing relative movement between the bearing surfaces of the parts.

Another object of the invention is to provide a ball and socket joint wherein the ball member is seated in opposed bearing rings, one of which is deformable and the other of which is rigid but shiftable to a limited extent without transferring endwise movement.

Another object of the invention is to provide a ball and socket tie rod joint wherein the stud and the socket can shift relative to each other to a limited extent without changing their angular relationships.

A still further object of the invention is to provide a joint assembly which will accommodate misalignment of members to which the parts of the joint are connected without changing the angular relationship of the members or parts.

A further object of the invention is to provide a shock absorbing joint assembly that will not create "mushy" operating conditions as, for example, when the joint is used in a steering linkage.

Other objects and features of the invention will be apparent to those skilled in the art from the following detailed description of the annexed sheet of drawings which, by way of a preferred example only, illustrates one embodiment of the invention.

On the drawings:

Figure 1 is a side elevational view, with parts in vertical cross section, of a ball and socket tie rod joint according to this invention.

Figure 2 is a view similar to Figure 1 but illustrating the joint parts in shifted position.

Figure 3 is a bottom plan view of the upper bearing ring for the joint of Figures 1 and 2.

Figure 4 is a top plan view of the bottom bearing ring for the joint of Figures 1 and 2.

As shown on the drawings:

In Figures 1 and 2 the reference numeral 10 designates a tie rod end composed of a housing 11 having a laterally extending externally threaded stem 12 for insertion in a tie rod, drag link, or the like (not shown). The housing 11 has a cylindrical bore 13 therein providing a socket chamber 14. The bore 14 extends from an open bottom to an end wall 15 which has a central aperture 16 therethrough. The open end of the housing is counterbored at 17 to provide a shoulder 18. A closure plate 19 is seated in the counterbore 17 against the shoulder 18 to close the open end of the housing chamber 14. The plate 19 is secured to the housing 11 by spinning a rim of the housing over the plate as at 20.

A ball stud 21 has the ball end 22 thereof disposed in the chamber 14 and has a shank with a neck portion 23 projecting freely through the aperture 16 in the wall 15. The shank has a tapered portion 24 for receiving the eye member of a steering arm or the like (not shown) in fixed rigid relation thereon. The tapered portion 24 converges to a threaded cylindrical portion 25 for receiving a locking nut to hold the eye member (not shown) on the tapered portion 24.

When the stem 12 of the housing is secured to a tie rod and the stud 21 is secured to a steering arm or the like, it is possible that the tie rod and steering arm might be somewhat misaligned and, in accordance with this invention, this misalignment is accommodated without tilting the joint parts.

An upper bearing ring 26, composed of rubber or the like resiliently deformable material, has a cylindrical outer wall of slightly larger diameter than the bore 13 of the housing 11 so that the ring fits in the chamber 14 of the housing with a slight press fit. This ring 26 is lined with a plastic or metal fragmental spherical bearing cup 27. The bearing cup 27 is bonded to the rubber 26 as by vulcanizing or the like. The cup 27 has the major diameter thereof at the bottom of the ring 26 and has an opening 28 through the top thereof of a larger diameter than the neck 23 of the stud. The cup 27 provides a fragmental spherical inner bearing surface in bearing engagement with the upper half of the ball end 22 of the stud.

A second or bottom bearing ring 29 is disposed in the chamber 14. This ring 29 has an outer cylindrical wall of lesser diameter than the bore 13 so that the ring fits loosely in the chamber 14. The ring 29 has a central fragmental spherical recess 30 therein with the major diameter thereof at the top of the ring. A circular opening 31 is provided at the bottom of the recess 30 through the bottom of the ring. The lower half of the ball end 22 of the stud is seated on the bearing wall provided by the recess 30, and the free end of the ball projects slightly through the opening 31. The bottom face of the ring is undercut around the periphery thereof to provide a recess 32 and thereby form a vertical shoulder 33 around the bottom of the ring. A coil spring 34 has the bottom end coil seated on the plate 19 and the top end coil seated in said recess 32 around the shoulder 33. The coil spring 34 is held under compression between the ring 29 and the plate 19 and serves to urge the ring toward the ring 26 to maintain complete bearing engagement between the bearing surfaces of the ring and the ball end 22 of the stud.

The ball end 22 of the stud 21 can tilt and rotate on the bearing surfaces provided by the cup 27 and the recess 30 and the stud therefore has universal movement relative to the housing 11. Since the bearing ring 29 is smaller than the bore 13 of the housing, it can shift sidewise relative to the housing until its side wall engages the bore 13 of the housing. As illustrated in Figure 2, when the housing 11 is subjected to endwise loading, the rubber ring 26 will deform to permit this loading until the ring 29 engages the wall 13 of the bore whereupon the load will be transferred through the ring 29 to the ball end 22 of the stud 21. The two bearings then take the full load, but, while the ring 29 is spaced from the housing wall, the rubber 26 will serve as a cushion or shock absorber, protecting the bearing surfaces of the ring. A limited shock absorbing action is provided without, however, permitting free shifting movements between the stud and housing such as occur when the stud is completely surrounded by rubber bushings.

The ring 29 is preferably composed of non-speaking rigid plastic material such as a phenolic condensation product or the like, or of non-ferrous graphitic carbon-impregnated self-lubricating metal. The liner 27 for the ring 26 is composed of similar material. The joints of this invention therefore need not be lubricated.

From the above descriptions it will be understood that this invention provides joint assemblies such as ball and socket joints which have limited shock absorbing capacity and insure proper articulating movements between the joint parts without creating "mushy" conditions between the parts.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint assembly comprising a housing having a side wall, a joint member in said housing, a resiliently backed bearing member tightly fitted in said housing against said side wall and engaging a portion of the joint member, and a rigid bearing member disposed in spaced relation to said side wall in said housing and engaging another portion of the joint member, said rigid bearing member being shiftable toward said side wall to engage the housing for limiting the amount of deformation of the resilient backing.

2. A joint construction comprising a socket having a side wall, a stud in said socket, a resiliently backed bearing member tightly fitted in said socket and surrounding a portion of said stud in bearing relation, a rigid bearing member loosely fitted in said socket for movement therein toward said side wall and surrounding a portion of said stud in bearing relation for sidewise movement therewith to limit relative sidewise movement between the socket and stud, and a spring urging said bearing members into bearing engagement with the stud.

3. A ball and socket joint comprising a socket member having a side wall, a ball stud having a ball end disposed in said socket member, a rubber ring tightly fitted in said socket around a portion only of the ball end of the stud, a bearing carried by said rubber ring, a rigid bearing ring disposed in said socket spaced from said side wall and surrounding the portion of the ball end of the stud projecting from the rubber ring, said rigid bearing ring being shiftable with the stud toward said side wall to engage the housing for limiting the amount of deformation of the rubber ring and spring means urging said elements together.

4. A ball and socket joint comprising a housing having a cylindrical side wall defining a socket chamber and having an apertured end wall giving access to said chamber, a ball stud having a ball end in said chamber and a shank projecting freely through the aperture in said wall end of the housing, opposed bearing rings surrounding the ball end of said stud in said chamber, one of said bearing rings being resiliently deformable and having tight fitting engagement with the housing, the other of said bearing rings being loosely disposed in the housing relative to said side wall and being composed of rigid material to limit relative sidewise movement of the stud and housing, and a spring urging said bearing rings together.

5. A ball and socket joint comprising a housing defining a chamber open at one end and partially closed at the other end by an apertured wall, a ball stud having a ball end disposed in said chamber and a shank projecting freely through the aperture in said apertured wall, a closure member closing the open end of said chamber, opposed bearing rings surrounding the ball end of said stud in said chamber, one of said bearing rings being resiliently deformable and having tight fitting engagement with the housing, the other of said bearing rings being rigid and disposed for movement with the stud toward the side wall of said chamber, and a spring compressed between the closure member and the bearing ring to urge the bearing rings together.

6. A ball and socket tie rod joint comprising a housing having an extending stem portion for attachment to a tie rod, said housing having a side wall defining a cylindrical chamber open at one end and partially closed at the other end by an apertured end wall, a ball stud having a ball end disposed in said chamber and a shank projecting freely through the aperture in said apertured end wall, a closure plate secured to said housing closing the open end of the chamber, a rubber ring in said chamber tightly fitted in the housing against said end wall, a rigid fragmental spherical bearing cup lining said ring in bonded relation therewith, said cup having an aperture freely receiving the shank of the stud therethrough and having a major diameter remote from the apertured end wall of the housing, a rigid bearing ring having an outer cylindrical wall spaced from the side wall of said chamber and having a fragmental spherical recess receiving the free end of the ball portion of the stud, said rigid ring having a recess in an end face thereof spaced from the closure plate, and a coil spring compressed between the closure plate and said rigid ring and seated in said recess of the ring for urging the rigid ring toward the rubber ring to maintain the bearing surfaces of the parts in bearing engagement.

7. A joint assembly comprising a housing having side and end walls defining a chamber, a stud in said chamber, a resiliently mounted bearing in said chamber surrounding a portion of said stud and tightly engaging said side walls for initially absorbing sidewise loads on said joint, and a rigid bearing in said chamber surrounding a portion of said stud spaced from the side walls of the socket and movable thereagainst in load bearing relation after said resilient bearing has been deformed due to sidewise loads.

JAMES H. BOOTH.

REFERENCES CITED

The following references are of record in the file of this patent:

UNITED STATES PATENTS

| Number | Name | Date |
| --- | --- | --- |
| 1,989,116 | Strauss | Jan. 29, 1935 |
| 2,071,341 | Huffers | Feb. 23, 1937 |
| 2,197,889 | Katcher | Apr. 23, 1940 |
| 2,328,330 | Edington | Aug. 31, 1943 |

FOREIGN PATENTS

| Number | Country | Date |
| --- | --- | --- |
| 494,650 | Great Britain | Oct. 28, 1938 |
| 509,969 | Great Britain | July 25, 1939 |